United States Patent
Jain et al.

(10) Patent No.: US 10,552,302 B2
(45) Date of Patent: Feb. 4, 2020

(54) SYSTEM AND METHOD FOR ANALYZING RISKS PRESENT IN A SOFTWARE PROGRAM CODE

(71) Applicant: OPSHUB, INC., Palo Alto, CA (US)

(72) Inventors: Sandeep Jain, Palo Alto, CA (US); Ramesh Venkataraman, San Ramon, CA (US)

(73) Assignee: OPSHUB, INC. CA (US)

( * ) Notice: Subject to any disclaimer, the term of this patent is extended or adjusted under 35 U.S.C. 154(b) by 0 days.

(21) Appl. No.: 14/789,991

(22) Filed: Jul. 2, 2015

(65) Prior Publication Data

US 2016/0004626 A1    Jan. 7, 2016

Related U.S. Application Data

(60) Provisional application No. 62/020,855, filed on Jul. 3, 2014.

(51) Int. Cl.
  *G06F 9/44*      (2018.01)
  *G06F 11/36*     (2006.01)

(52) U.S. Cl.
  CPC ............... *G06F 11/3684* (2013.01)

(58) Field of Classification Search
  CPC ............ G06F 11/3688; G06F 11/3664; G06F 11/3684; G06F 11/3466; G06F 11/3636
  See application file for complete search history.

(56) References Cited

U.S. PATENT DOCUMENTS

| | | | | |
|---|---|---|---|---|
| 2005/0246207 A1* | 11/2005 | Noonan | ............. | G06F 11/3409 705/4 |
| 2011/0067005 A1* | 3/2011 | Bassin | .................. | G06F 11/008 717/127 |
| 2014/0282406 A1* | 9/2014 | Narasimhan | .......... | G06F 11/008 717/124 |
| 2015/0067648 A1* | 3/2015 | Sivanesan | ........... | G06F 11/3684 717/124 |
| 2015/0309918 A1* | 10/2015 | Raghavan | ........... | G06F 11/3688 714/38.1 |

* cited by examiner

*Primary Examiner* — Chat C Do
*Assistant Examiner* — Lenin Paulino
(74) *Attorney, Agent, or Firm* — Barry Choobin; Patent 360 LLC

(57) ABSTRACT

A system and method for analyzing risk factors to enhance the quality of program code have been disclosed. The risks are identified and evaluated, post which test cases are defined for each of the identified risk factors. Further, the defect density, code complexity and change rate corresponding to each of the test cases is determined. Risk profiles are created for each of the test cases. The risk profiles are categorized based on defect density, complexity of the code and change rate. The test cases are evaluated depending upon the risk posed by new scripts added to the program code. The scripts need to be executed for satisfying a necessary and sufficient condition are decided based on the correlation between program code files, activities on those files, defects corresponding to those files and test cases used to test those defects.

2 Claims, 5 Drawing Sheets

SYSTEM AND METHOD FOR ANALYZING RISKS PRESENT IN A SOFTWARE PROGRAM CODE

CROSS REFERENCE TO RELATED APPLICATIONS

This patent application claims the priority of the U.S. Provisional Patent Application No. 62/020,855 filed on Jul. 3, 2014, having the title "System and Method for Analyzing Risks to Enhance Quality of Source Code During Software Development", and the content of which is incorporated herein by reference in its entirely.

BACKGROUND

Technical Field

The embodiments herein generally relate to a method and system for testing software code. The embodiments herein particularly relate to a method and system for analyzing and assessing multiple risk factors encountered during software development. The embodiments herein more particularly relate to a system and method for evaluating multiple risks and categorizing risk profiles for generating a series of test cases during software development life cycle.

Description of the Related Art

Typically, program code for a software application is instrumented to collect data about the execution of lines and branches of the code in response to running or execution of (a) test suitee(s). It is desirable to run test the software application in such a manner that every function, statement, and other suitable constructs in the application are executed during testing. This process allows developers and programmers to look for parts of a software application that are rarely or never accessed under normal operating/testing conditions. The code coverage provides a result that may be analyzed to identify which areas of the code have not been executed/implemented.

Changes to the source code requires corresponding changes be made to test scripts/test cases for covering the new segments of code. Similarly, software code can be optimized/deleted depending on needed functionality. Over time, there can be accumulation of cases that grow unchecked with no corresponding business scenario to be tested. However, simple elimination of these cases could render other areas of the source code vulnerable to not being tested.

Various methodologies are proposed in the art for testing software codes. One such method decides the level of testing software codes, based on just code complexity. Based on code complexity (and target coverage rate for a given complexity) the prior-art method recommends additional test cases. The prior-art method does not consider various other scenarios that impacts on the changed source code/software program script, but is restricted only to determining the complexity the code, usages of files (incorporating software program code) defects found in the files and the like.

While complete coverage is the ideal goal and practice, the actual code coverage is significantly lower. It is typically not possible to develop new test cases to provide coverage for all the uncovered code in a single step. Therefore, there is a need to prioritize which subset of the code which is uncovered should be the focus of additional test development in order to maximize the value of the resources invested in developing new test cases.

Hence, there is a need for a method and system for testing various scenarios that impact on the changed source code/software program script during software development. There is also a need for a method and system for analyzing and assessing multiple risk factors during software development life cycle. Further, there is also need for a method and system for evaluating multiple risks and categorizing risk profiles for a series of test case during software development.

Normally, prior to a code being introduced in a software application in production, it goes through regular, multiple regression cycles. But prioritizing which test cases/test scripts need to be executed is restricted to only on the current activity but not on the history.

Hence, there is a need for a method and system for prioritizing which test cases/test scripts need to be executed for a necessary and sufficient condition. There is also a need for a method and system for testing all scenarios that impact on the changed (software code) source file/software program based on the history and the current activity.

The abovementioned shortcomings, disadvantages and problems are addressed herein and which will be understood by reading and studying the following specification.

OBJECTIVES OF THE EMBODIMENTS

The primary object of the embodiments herein is to provide a system and method for analyzing and assessing multiple risk factors during software development life cycle.

Another object of the embodiments herein is to provide a system and method for evaluating multiple risks and categorizing risk profiles for a series of test cases during software development life cycle.

Yet another object of the embodiments herein is to provide a method and system for prioritizing code areas for additional testing based on risks.

Yet another object of the embodiments herein is to provide a method and system for evaluating multiple test case scenarios depending on the risk posed by the new code changes added to a software program code.

Yet another object of the embodiments herein is to provide a method and system for testing various scenarios impacting on the changed software program code based on the history and the current activity performed thereupon.

These and other objects and advantages of the embodiments herein will become readily apparent from the following detailed description taken in conjunction with the accompanying drawings.

SUMMARY

The embodiments herein envisages a computer implemented system for identifying risks present in a software program code. The system comprises a processor for processing the software program code and analyzing the risks present in the software program code. The system further includes an evaluator for evaluating each of the risks present in the software program code.

According to one embodiment herein, the system further includes a profile creator cooperating with the evaluator and configured to generate a risk profile corresponding to the software program code, based on defect density, complexity and change rate of the software program code.

According to one embodiment herein, the system further includes a test suite for generating test cases corresponding to the risks present in the software program code. The defect density, complexity and change rate corresponding to the software program code are analyzed prior to the execution of the corresponding test cases. The test suite generates revised test case in response to the software program code being modified, and further executes revised test case(s) corresponding to the modified software program code.

According to one embodiment herein, the profile creator is further configured to generate a risk profile corresponding to the modified software program code, based on the defect density, complexity and change rate of the modified software program code.

According to one embodiment herein, the test suite is further configured to determine whether the test cases are executable. The test suite is further configured to compute the complexity of the source code covered by the test cases, in the event that the test cases are determined to be executable.

According to one embodiment herein, the defect density, complexity and change rate of the software program code are ranked in terms of respective percentiles.

According to one embodiment herein, the system further includes a comparator configured to compare the risk profile corresponding to the software program code and the risk profile corresponding to the modified software program code, and compute the risk associated with the software program code based on comparison of the risk profile corresponding to the software program code, and the risk profile corresponding to the modified software program code.

The various embodiments herein envisages a computer implemented method for identifying risks present in a software program code, the method comprising the following computer implemented steps:
  processing the software program code using a processor, and analyzing the risks present in the software program code;
  evaluating each of the risks present in the software program code, using an evaluator;
  generating test cases corresponding to the risks present in the software program code, and executing generated test cases and calculating a defect density, complexity and change rate corresponding to the software program code; and
  generating revised test case in response to the software program code being modified, and executing revised test case(s) and calculating a defect density, complexity and change rate corresponding to the modified software program code.

According to one embodiment herein, the method further includes the following steps:
  generating a risk profile corresponding to the software program code, based on at least one of the defect density, complexity and change rate of the software program code; and
  generating a risk profile corresponding to the modified software program code, based on the defect density, complexity and change rate of the modified software program code.

According to one embodiment herein, the step of generating test cases corresponding to the risks present in the software program code further includes the following steps:
  determining whether the test cases are executable; and
  computing the complexity of the source code covered by the test cases, in the event that the test cases are determined to be executable.

According to one embodiment herein, the step of calculating a defect density, complexity and change rate corresponding to the software program code test case further includes the step of ranking the defect density, complexity and change rate of the software program code, in terms of respective percentiles.

According to one embodiment herein, the method further includes the step of comparing the risk profile corresponding to the software program code and the risk profile corresponding to the modified software program code, and computing the risk associated with the software program code based on comparison of the risk profile corresponding to the software program code, and the risk profile corresponding to the modified software program code.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
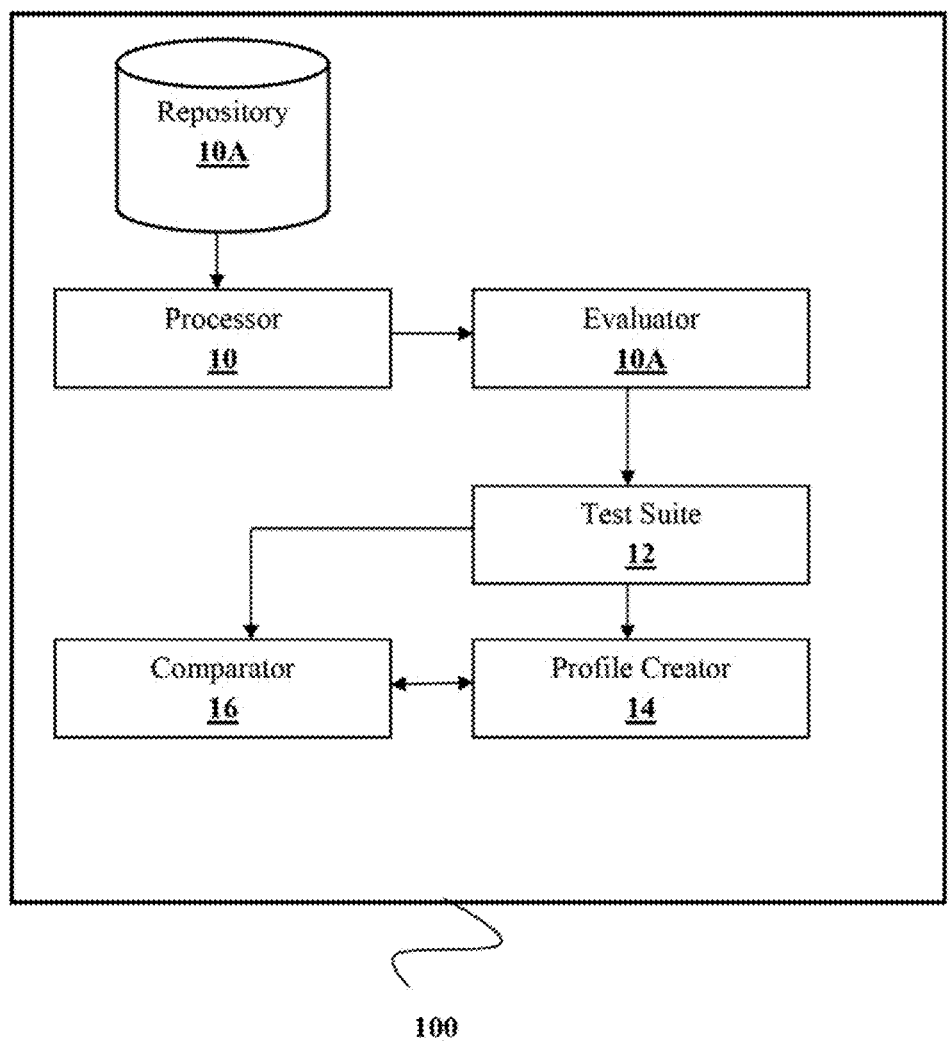
FIG. 1 is a system level block diagram illustrating a system for analyzing risks to present in a software program code, according to an embodiment herein.

FIG. 1 is a block diagram illustrating the components of the system 100 for analyzing the risks present in a software program code, according to one embodiment herein. The system 100 includes a processor 10 for processing the software program code (stored in a repository 10A) and analyzing the risks present in the software program code. The processor 10 identifies risk factors associated with the software program code including but not restricted to unused variables, unnecessary object creation, possible null pointer exceptions, dead code, duplicate codes and incorrect expressions.

According to one embodiment herein, the system 100 further includes a test suite 12 for generating test cases corresponding to the risks present in the software program code. Typically, constantly changing source code requires corresponding changes be made to test scripts/test cases covering the new piece of code. Similarly, code can be optimized/deleted depending on needed functionality. Over time, there can be accumulation of cases that grow unchecked with no corresponding business scenario to be tested. However, simple elimination of these cases could render other areas of the source code vulnerable to not being tested. The test suite 12 determines whether the test cases are executable.

According to one embodiment herein, the system further includes an evaluator 10A configured to calculate, a defect density, complexity and change rate corresponding to the software program code.

According to one embodiment herein, typically, the defect density is calculated based on the past history (defects over a time range) of defects associated with a source (software program code) file. Typically, the complexity of code is a standardized/predetermined number with higher numbers corresponding to higher levels of risk. Typically, the change rate corresponds to changes within a source file over a period of time (modified and deleted lines of code).

According to one embodiment herein, in the event that the software program is modified/revised, the test suite 12 generates revised test case in response to the software program code being modified, and further directs the evaluator 10A to calculate a defect density, complexity and change rate corresponding to the modified software program code.

According to one embodiment herein, the system 100 further includes a profile creator 14 cooperating with the test suite 12 and configured to generate a risk profile corresponding to the software program code, based on the defect density, complexity and change rate of the software program code.

Figure 1A:
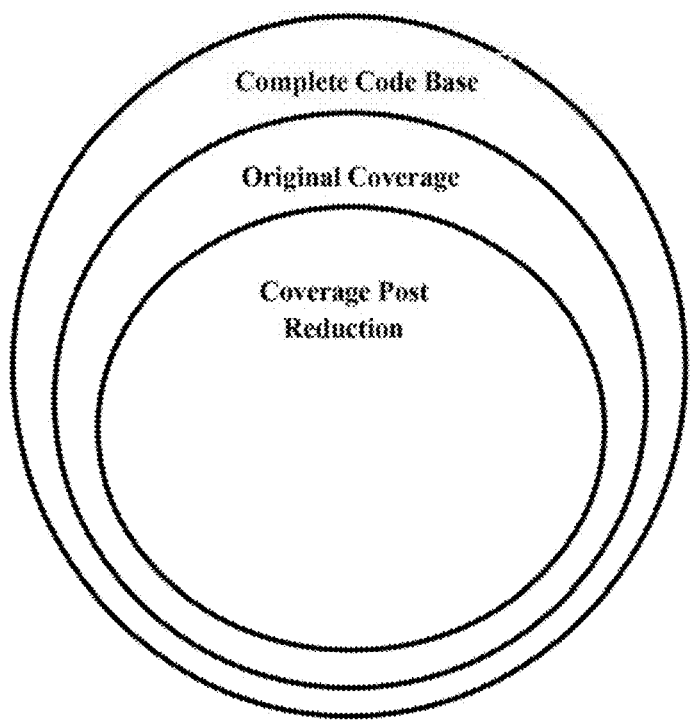
FIG. 1A is a block diagram illustrating a reduction in code coverage due to removal of certain scripts from the software program code, according to one embodiment herein.

According to one embodiment herein, in the event that the software program code has been modified/revised, and revised test case has been generated by the test suite 12, the profile creator 14 generates a risk profile corresponding to the modified software program code, based on the defect density, complexity and change rate of the modified software program code. The profile creator 14 performs risk analysis to determine additional risk to the quality of the software program code due to reduction in code coverage as a result of script removal (as shown in FIG. 1A).

Figure 1B:
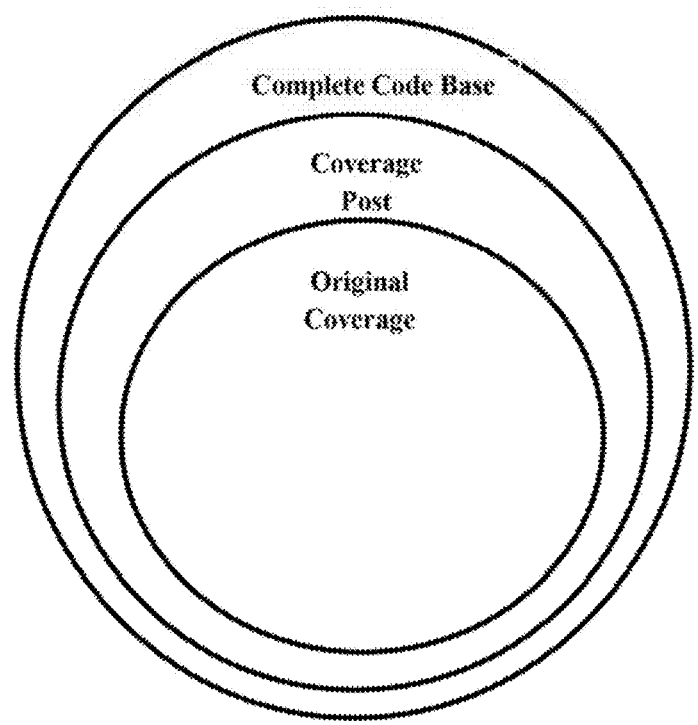
FIG. 1B is a block diagram illustrating an increase in code coverage due to addition of certain scripts from the software program code, according to one embodiment herein.

According to one embodiment herein, the profile creator 14 also accounts for the additional risk to the quality due to reduction in code coverage as a result of script removal from the software program code. The profile creator 14 also quantifies the risk profile of the additional code covered as a result of scripts being added to the software program code. The profile creator 14 performs risk analysis to determine additional risk to quantify the risk profile of the additional code covered as a result of addition of new scripts (as shown in FIG. 1B) to the software program code. The profile creator 14 preferably provided color codes to the values corresponding to defect density, complexity and change rate to indicate the level of risk.

According to one embodiment herein, the test suite 12 executes the original test case, revised version of the test case and compares the revised version of the test case against the original test case for determining increase/decrease in the risk.

According to one embodiment herein, the test suite 12 prioritizes test cases based on the risks associated with the software program code. The test suite evaluates a test case scenario depending upon the risk posed by a new source code that is added to the software program code. Typically, prior to a patch/change set (a new software program code) being introduced in production, it goes through regular regression cycles. But prioritizing which scripts need to be executed for a necessary and sufficient condition is determined by the correlation between the files of the software program code, activities on those files, defects fixed by those files and the test cases used to test those defects. This approach provides for all scenarios that can impact a changed source file/patch to be considered and tested, since the test scenarios are based on history and not just current activity.

According to one embodiment herein, firstly the test suite 12 analyses the files in the patch/change set, derives the activities, deduces the defects and arrives at a first set of test cases needed for minimizing the risk associated with the patch/change set. Subsequently, the test suite 12 analyses all activities on those set of files comprising the patch, derives the activities for a 12 month period, deduces the defects associated with these activities and establishes a second set of test cases, thereby covering not only the existing change but also the possible impact as witnessed by past testing. The set of test cases determines the risk level for this patch. The larger the patch/change set, the greater the risk from introduction of this Patch. To minimize this risk, the set of test cases from first set must include all the cases from second set (of test cases).

According to one embodiment herein, the test suite 12 is further configured to rank the defect density, complexity and change rate of the software program code, in terms of respective percentiles.

According to one embodiment herein, the system 100 further includes a comparator 16 configured to compare the risk profile corresponding to the software program code and the risk profile corresponding to the modified software program code, and compute the risk associated with the software program code based on comparison of the risk profile corresponding to the software program code, and the risk profile corresponding to the modified software program code.

Figure 2:
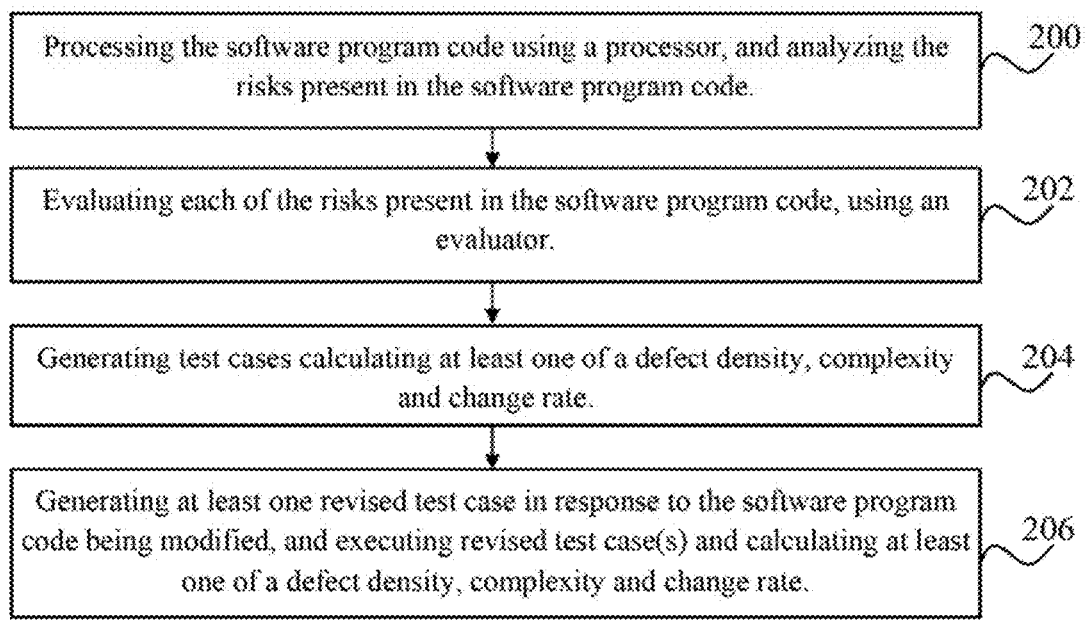
FIG. 2 is a flowchart illustrating the steps involved in the method for analyzing risks present in a software program code, according to an embodiment herein.

FIG. 2, there is shown a flow chart illustrating the steps involved in the method for analyzing the risks present in a software program code. The method, according to one embodiment herein, comprises the following steps: processing the software program code using a processor, and analyzing the risks present in the software program code (200);

evaluating each of the risks present in the software program code, using an evaluator (202);

generating test cases corresponding to the risks present in the software program code, and executing generated test cases and calculating a defect density, complexity and change rate corresponding to the software program code (204); and generating revised test case in response to the software program code being modified, and executing revised test case(s) and calculating a defect density, complexity and change rate corresponding to the modified software program code (206).

According to one embodiment herein, the method further includes the following steps:

generating a risk profile corresponding to the software program code, based on at least one of the defect density, complexity and change rate of the software program code; and generating a risk profile corresponding to the modified software program code, based on the defect density, complexity and change rate of the modified software program code.

According to one embodiment herein, the step of generating test to cases corresponding to the risks present in the software program code further includes the following steps:

determining whether the test cases are executable; and computing the complexity of the source code covered by the test cases, in the event that the test cases are determined to be executable.

According to one embodiment herein, the step of calculating a defect density, complexity and change rate corresponding to the software program code test case further includes the step of ranking the defect density, complexity and change rate of the software program code, in terms of respective percentiles.

According to one embodiment herein, the method further includes the step of comparing the risk profile corresponding to the software program code and the risk profile corresponding to the modified software program code, and computing the risk associated with the software program code based on comparison of the risk profile corresponding to the software program code, and the risk profile corresponding to the modified software program code.

According to one embodiment herein, the system 100 prioritizes test cases based on corresponding risks. The system 100 evaluates the test case scenario depending on the risk posed by the new source code. The system 100 prioritizes which scripts need to be executed for a necessary and sufficient condition. Further, the scripts are determined by the correlation between the files, activities on those files, defects fixed by those files and the test cases used to test those defects.

According to one embodiment herein, the test case determination comprises at-least two distinct streams. The first stream analyses the files in the software program script/change set, derives the activities, deduces the defects and arrives at the test cases needed for minimizing risk. The second stream performs various activities on those set of files comprising the software program script, deriving the activities for a pre-determined period, such as '12' months, deducing the defects associated with this activities and establishing a list of test cases.

Figure 3:
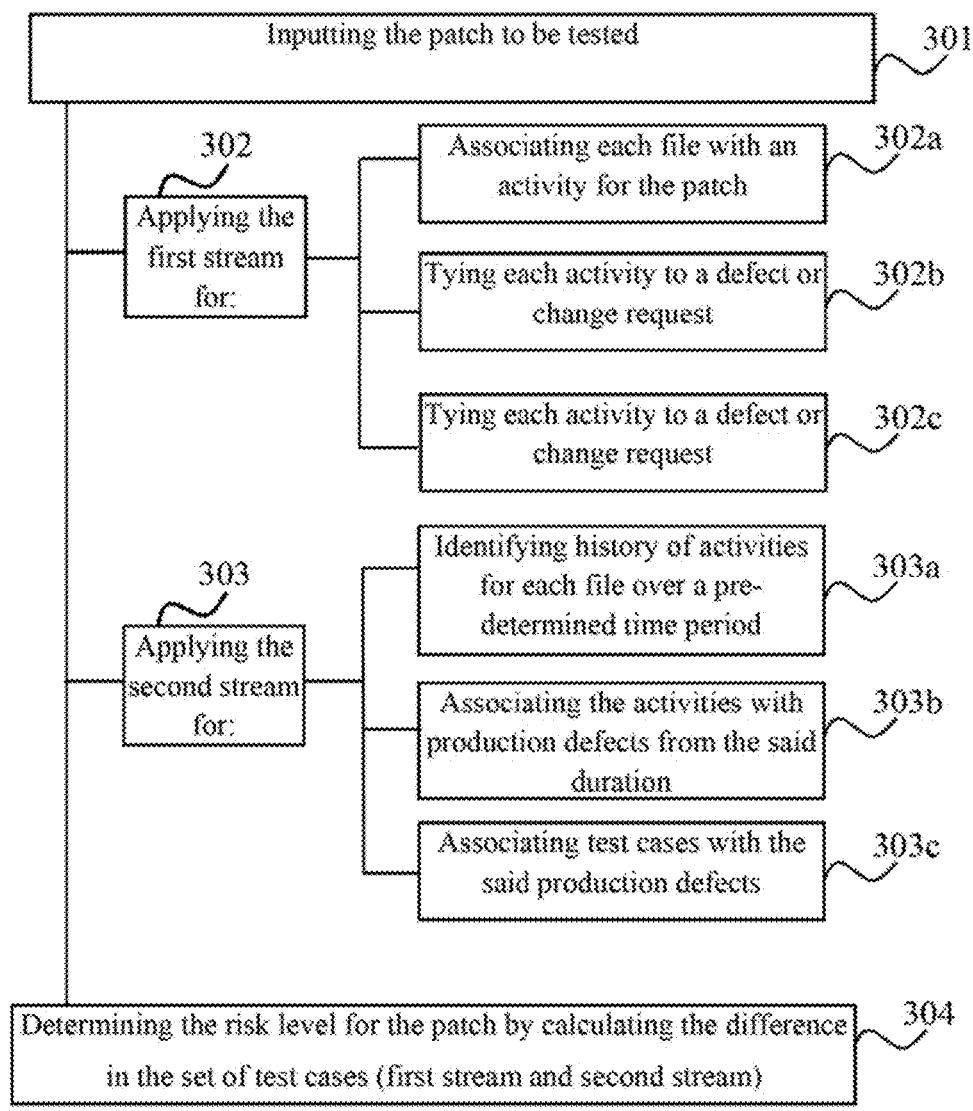
FIG. 3 is a flowchart illustrating a method for determining the correlation between the files in a software program script, according to an embodiment herein.

FIG. 3 is a flowchart illustrating a method for determining the correlation between the files in a software program script, according to an embodiment herein. The method for determining the correlation between the files comprises the steps of: inputting the software program script to be tested (step 301); applying the first stream for (step 302): associating each file with an activity for the software program script (step 302*a*), tying each activity to a defect or change request (step 302*b*), and tying each defect/change request to a test case (step 302*c*); applying the second stream for (step 303): identifying history of activities for each file over a pre-determined time period (step 303*a*), associating the activities with production defects from the duration (step 303*b*), and associating test cases with the production defects (step 303*c*); and determining the risk level for the software program script by calculating the difference in the set of test cases (first stream and second stream) (step 304). According to one embodiment herein, the set of all the test cases from the second stream are included in the first stream to minimize the risk level.

The technical advantages of the various embodiments disclosed herein include realization of a system and method for analyzing and assessing multiple risk factors during software development. The system and method envisaged by the present disclosure evaluate multiple risks and categorize risk profiles for a series of test case during software development. The system and method also prioritize test cases, based on risks. The method and system evaluate multiple test case scenarios depending on the risk posed by the new scripts added to an existing software program code. Further, the system and method test various scenarios impacting on the changed software program code based on the history and the current activity performed thereupon.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications.

What is claimed is:

1. A computer implemented system comprising a hardware processor and memory loaded with instructions for identifying risks present in a software program code, the system, comprising: a processor configured to run instructions to process the software program code, and analyze the risks present in the software program code: an evaluator module run on the processor and configured to evaluate each of the risks present in the software program code, and wherein said evaluator module is further configured to calculate a defect density, complexity and change rate corresponding to the software program code, and wherein said evaluator module is further configured to calculate a defect density, complexity and change rate corresponding to a modified software program code, wherein the evaluator module is further configured to rank the defect density, complexity and change rate of the software program code, in terms of respective percentiles;

a test suite run on the processor and configured to generate test cases corresponding to the risks present in the software program code, and wherein said test suite is further configured to execute generated test cases, and wherein the test suite is still further configured to generate revised test case in response to the software program code being modified, and wherein the test suite is further configured to execute revised test case(s), and wherein said test suite is further configured to prioritize the generated test cases based on evaluated risks, and wherein the test suite is configured to compare the revised test case with the original test case for determining increase/decrease in the risks, and wherein the test suit is configured to prioritize one or more scripts to be executed, and wherein the one or more scripts are determined based on correlation between the files, activities on the files, defects fixed by the files, and the test cases used to test the defects;

a profile creator run on the processor and configured to generate a risk profile corresponding to the software program code, based on the defect density, complexity and change rate of the software program code, and wherein the profile creator is further configured to generate a risk profile corresponding to the modified software program code, based on the defect density, complexity and change rate of the modified software program code, and wherein the profile creator is configured to perform a risk analysis to determine an additional risk to the modified software program code and quantify the additional risk, and wherein the test suite is configured to test a plurality of scenarios impacting in the modified software program code based on history and a current activity performed thereon; and a computer module run on the processor and configured to compare the risk profile corresponding to the software program code and the risk profile corresponding to the modified software program code, and compute the risk associated with the software program code based on comparison of the risk profile corresponding to the software program code, and the risk profile corresponding to the modified software program code: wherein the test suite is further configured to determine whether the test cases are executable, the test suite further configured to compute a complexity of the software program code covered by the test cases, in the event that the test cases are determined to be executable.

2. A computer implemented method comprising instructions stored on a non-transitory computer readable storage medium and run on hardware processor in a computer system for identifying risks present in a software program code, the method comprising the following computer implemented steps:

processing the software program code using a processor, and analyzing the risks present in the software program code;

evaluating each of the risks present in the software program code, using an evaluator, and calculating a defect density, complexity and change rate corresponding to the software program code;

generating test cases corresponding to the risks present in the software program code with a test suite, and executing generated test cases;

generating revised test cases in response to the software program code being modified with the test suite, and executing revised test case(s);

calculating a defect density, complexity and change rate corresponding to the modified software program code;

ranking the defect density, complexity and change rate of the software program code, in terms of respective percentiles;

prioritizing the generated test cases with the test suite based on evaluated risks, and wherein one or more scripts to be executed are prioritized, and wherein the one or more scripts are determined based on correlation between the files, activities on the files, defects fixed by the files, and the test cases used to test the defects;

generating a risk profile corresponding to the software program code with a profile creator, based on at least one of the defect density, complexity and change rate of the software program code; and generating a risk profile corresponding to the modified software program code with the profile creator, based on the defect density, complexity and change rate of the modified software program code;

comparing the risk profile corresponding to the software program code and the risk profile corresponding to the modified software program code with the profile creator, and computing the risk associated with the software program code based on comparison of the risk profile corresponding to the software program code, and the risk profile corresponding to the modified software program code, and wherein the test suite is configured to compare the revised test case with the original test case for determining increase/decrease in the risks; and wherein the profile creator is configured to perform a risk analysis to determine an additional risk to the modified software program code and quantify the additional risk to the modified software program code and quantify the additional risk, and wherein the test suite is configured to test a plurality of scenarios impacting on the modified software program code based on history and a current activity performed thereon;

wherein the step of generating test cases corresponding to the risks present in the software program code further includes the following steps;

determining whether the test cases are executable using the test suite; and computing the complexity of the software program code covered by the test cases using the test suite in the event that the test cases are determined to be executable.

* * * * *